United States Patent
Hsiao

(10) Patent No.: US 6,806,682 B2
(45) Date of Patent: Oct. 19, 2004

(54) CHARGING DEVICE WITH RETRACTABLE CHARGING PLUG

(75) Inventor: Leroy Hsiao, Ta-Yuan Hsiang (TW)

(73) Assignee: Len Cheng Brother Co., Ltd., Taoyuan County (TW)

( * ) Notice: Subject to any disclaimer, the term of this patent is extended or adjusted under 35 U.S.C. 154(b) by 0 days.

(21) Appl. No.: 10/339,296

(22) Filed: Jan. 10, 2003

(65) Prior Publication Data
US 2004/0135543 A1 Jul. 15, 2004

(51) Int. Cl.[7] .............................................. H01M 10/46
(52) U.S. Cl. ...................................... 320/107; 320/111
(58) Field of Search ................................ 320/107, 111, 320/113, 114, 115; 439/501, 504; 191/12.2 R, 12.4

(56) References Cited

U.S. PATENT DOCUMENTS

| | | | |
|---|---|---|---|
| 5,923,147 A | * | 7/1999 | Martensson ................. 320/111 |
| 6,059,081 A | * | 5/2000 | Patterson et al. ...... 191/12.2 R |
| 6,402,546 B1 | * | 6/2002 | Groves et al. .............. 439/501 |
| 6,589,069 B1 | * | 7/2003 | Liao ............................ 439/501 |
| 2003/0111978 A1 | * | 6/2003 | Wang .......................... 320/114 |

* cited by examiner

Primary Examiner—Edward H. Tso
(74) Attorney, Agent, or Firm—Troxell Law Office PLLC

(57) ABSTRACT

A reel charging device includes a casing integral with electrically interconnected charging plug and a power outlet plug, the casing incorporating a reel capstan complete with a winding groove to facilitate housing of coil of leader whereby the charging plug rests onto the charging device, and said winding groove will release the coil of leader to suitable length as required; outside the rotative perimeter of the reel capstan are a plurality of dents which in a stay-put setting allows for catching of a claw by resilient action, the claw being part of an actuator, then, of the casing, so that the coil of leader rolled up in position in the reel capstan is restrained from being disengaged by a pull unless the actuator, being worked upon by force, is displaced to release the claw from the fed position in the dents.

8 Claims, 8 Drawing Sheets

CHARGING DEVICE WITH RETRACTABLE CHARGING PLUG

BACKGROUND OF THE INVENTION (1) Field of the Invention

This invention provides a reel charging device, meant for use with portable electronic products, featuring power supply capability, more specifically it provides a portable type charging device complete with plugged leader coil roll-up feature.

(2) Description of the Prior Art

Concurrent with recent developments in portable electronic communication and information products, where the central theme goes for the utmost that is possible in minimization of size, weight and thickness, such as cellular phone sets, palm-held computers, personal digital assistants (PDA) and family camera, consumers everywhere are becoming more and more demanding on the endurance of their portable electronic product or commodity per completion of charging execution.

Taking the cellular phone, that is, mobile phone, for instance, the user will generally base the need to carry along from place to place redundant cells or a charging device instead in terms of the endurance performance of the cell already charged and loaded in the phone set, so that the phone set may work all the while once the cell in use runs out of power, by a timely recharging operation or replacement of the cell in Question.

To accommodate the setting of service, charging devices by and large have come realized in two alternative executions, the one being mounting charge mode, the other being in transit charging mode, with the in transit charging mode executed to comprise essentially a segment of leader with both terminals configured to be a plug, featuring convenient portability by reason of compact size when folded up, still, the segment of leader is typically rather long such that the user will always find it cumbersome, for a meandering segment of leader will time and again twist and kink up when put to use, moreover, with the leader wanting a fixed pattern for closure, if only the user wishes to store it away neatly then he will have to tidy up the leader after each use, and to set it loose when he needs to use it again, and that is very much a nuisance indeed to the user.

SUMMARY OF THE INVENTION

In view of each and every inconvenience cited in the foregoing, this invention is introduced to provide a charging device featuring easy portability and neat tidying up of the leader part as well.

In pursuit of the above-mentioned object, this invention includes a casing integral with electrically interconnected charging plug and a power outlet plug, the casing incorporating a reel capstan complete with a winding groove to facilitate housing of coil of leader in respect of which the charging plug rests onto the charging device, and said winding groove will release the coil of leader to suitable length as required; on the outer rim of the rotative perimeter of the reel capstan are formed a plurality of dents which in a stay-put setting allows for catching of a claw by resilient action in a normal state, the claw being part of an actuator which forms part of the casing, to the effect that the coil of leader once rolled up in position in the reel capstan, is restrained from being disengaged by a pull unless the actuator, being worked upon by externally applied force, is displaced to have the claw released from the fed position in the dents.

The present invention can be best understood through the following description and accompanying drawing, wherein:

DETAILED DESCRIPTION OF THE PREFERRED EMBODIMENT

Figure 1:
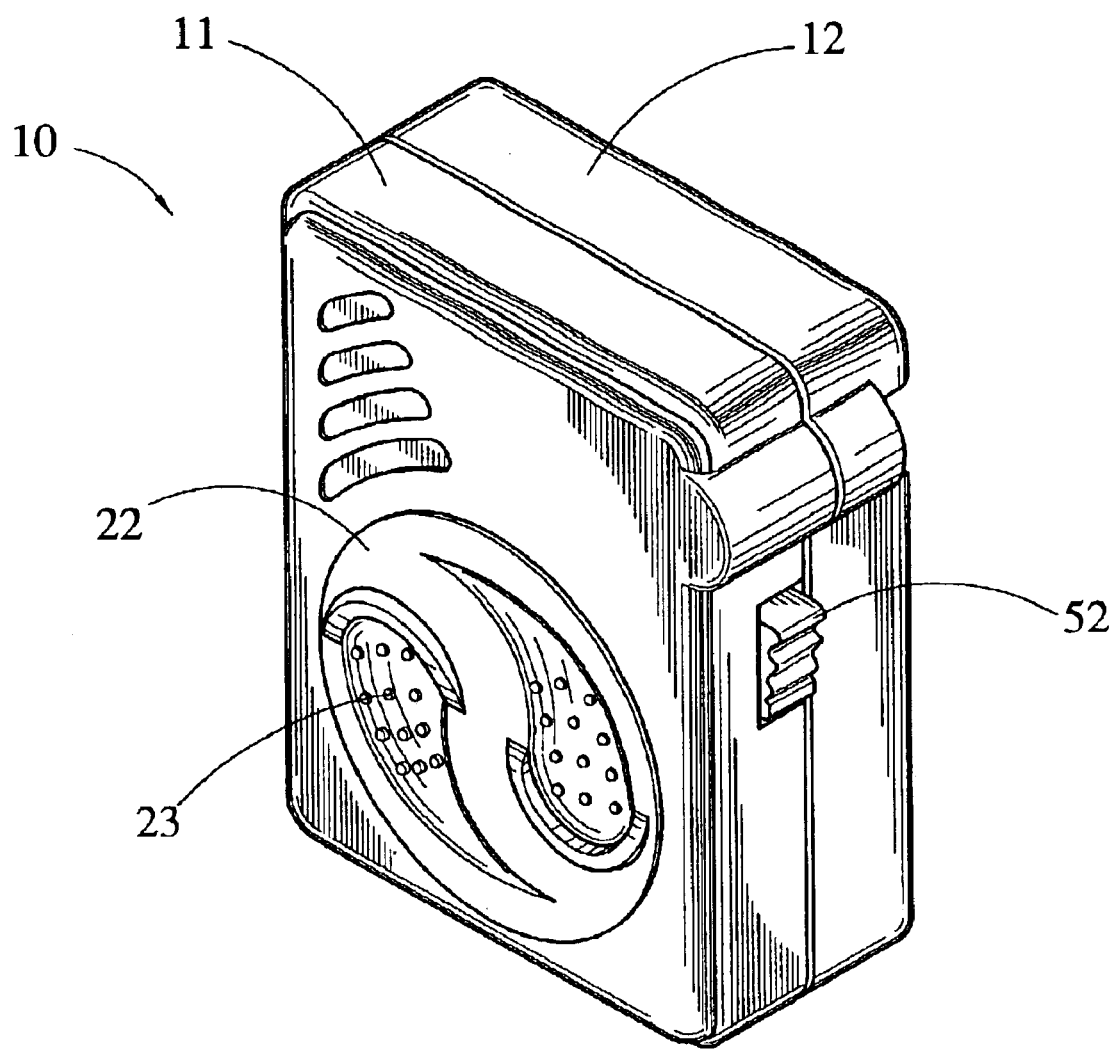
FIG. 1 is a three-dimensional view of the present invention.
Figure 2:
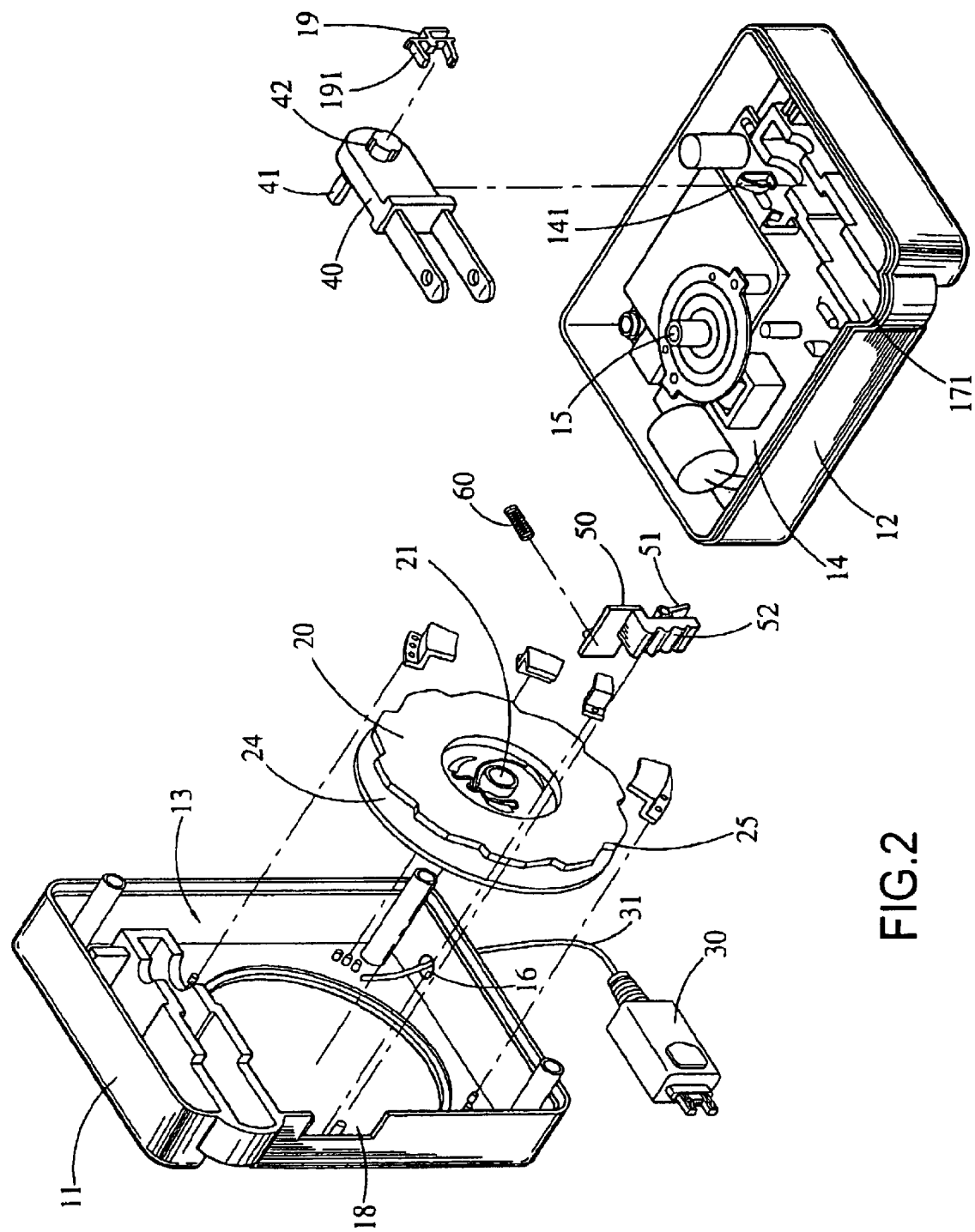
FIG. 2 is an exploded three-dimensional view of the present invention.
Figure 3:
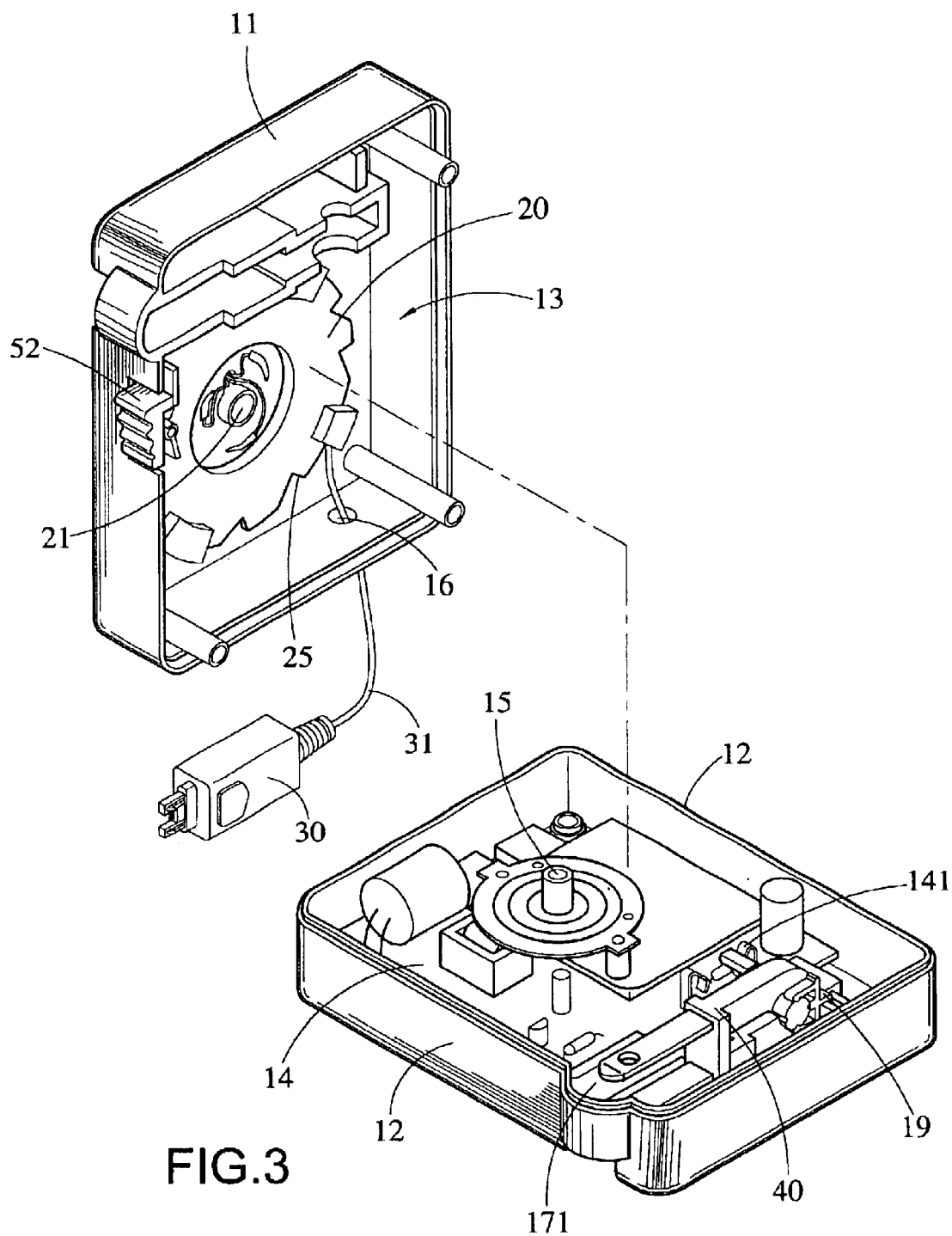
FIG. 3 is an exploded three-dimensional view of the upper half of the casing versus the lower half of the casing of the present invention.

A reel charging in accordance with the present invention, as shown in FIG. 1 to FIG. 3, a reel device includes a casing 10, a reel capstan 20, a charging plug 30, a receptacle plug 40 and an actuator 50.

A casing 10 which consists of the upper half 11, and the lower half 12, and both halves allowing for the formation of a stowage 13 wherein accommodated is a circuit board 14 integral with a transformation rectification, on either of both upper and lower halves 11, 12 of the casing 10 is attached a hinge 15.

A reel capstan 20, executed to be a flat disk centered by an axial hole 21, meant for coupling with the hinge 15 so that with respect thereto the reel capstan 20 is rotatable confined is the casing 10; the reel capstan 20 being furnished with a dial 22 exposed outside the casing 10, on which is furnished at least a stress receptacle trough 23 which will respond to turn about against force applied thereto; on the outer rim of the reel capstan 20 is formed a notched winding groove 24, also on equal intervals of the outer rim of the rotative perimeter are formed a plurality of engagement dents 25.

Figure 10:
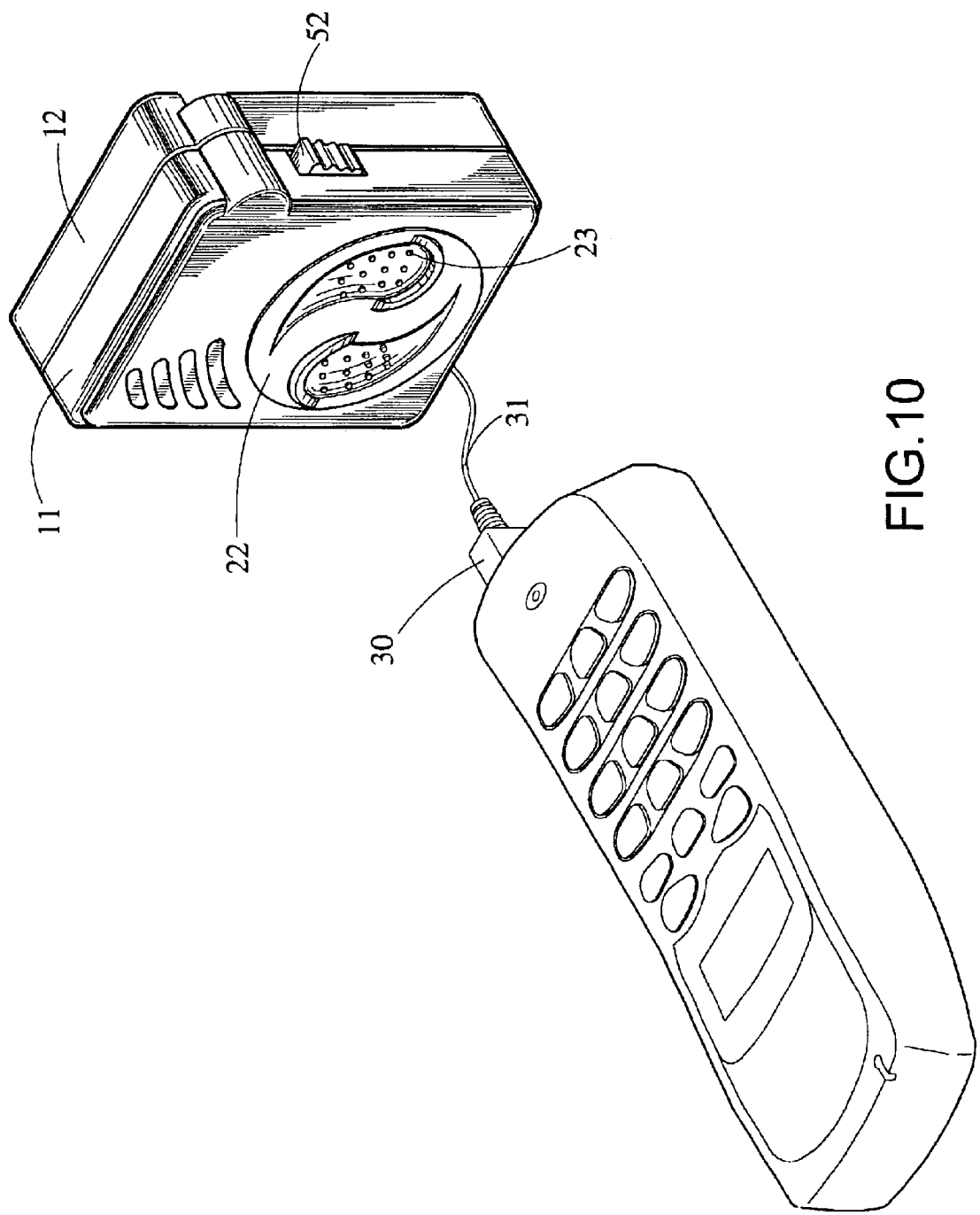
FIG. 10 illustrates an embodiment of the present invention with its charging plug coupled to an exemplary portable electronic commodity.

A charging plug 30, linked structurally to leader 31 that is wound in the winding groove 24, the leader 31 may be protracted outside of the casing 10 by way of passage hole 16 provided on the casing; the charging plug 30, once inserted into the charging access port present on a given portable electronic commodity, will enable charging function (as shown in FIG. 10); for execution, the charging plug 30 may be specified to match the corresponding specifications of the charging access port of the intended electronic commodity concerned.

Figure 6:
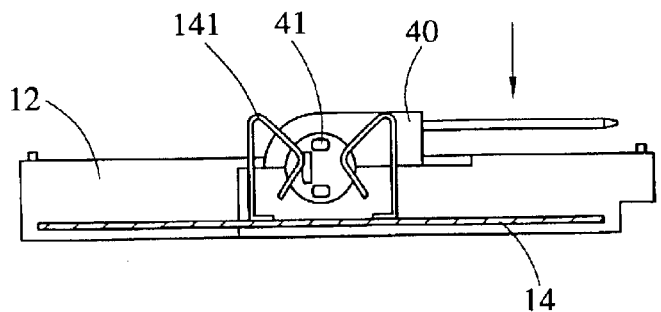
FIGS. 6,7 illustrate altogether the charging plug opposed to the power access position, on the one hand; to the resting position, on the other hand, structured according to the present invention.
Figure 7:
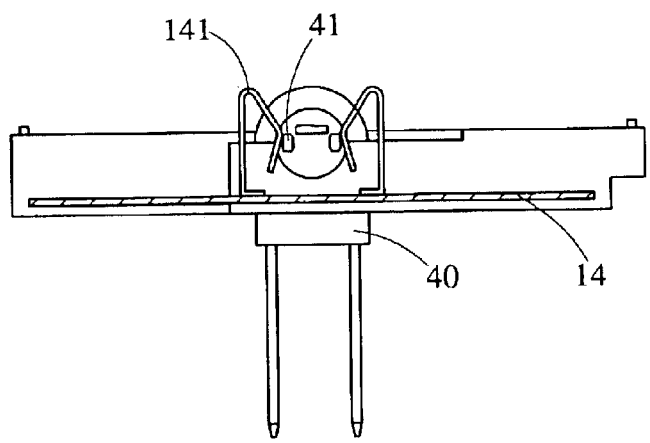

A receptacle plug 40 that is in electric conduction with The charging plug 30 and which is good for insertion into a socket of ordinary specification, whereby power supplied from the socket is transmitted to charging plug 30 via leader 31, to enable charging with respect to an intended electronic commodity that is enabled by the charging plug 30, and, depending on the specifications of a given locality of operation, the model of the receptacle plug 40 is determined; from the drawings given for illustration of the invention it can be seen that external to the casing 10 there is formed a first match groove 171 whereby the receptacle plug 40 is brought to stowage position (as shown in FIG. 6), once the receptacle plug 40 is established in the stowage position and then laid flat into the first match groove 171, the surface of the casing 10 will remain neat and flush all the same, the fact that the receptacle plug 40 is hinged to the casing 10 makes possible the shifting of the receptacle plug 40 to a power access point relative to the casing 10, such as is illustrated in FIG. 7, followed by accessing to the power socket assembly.

Figure 4:
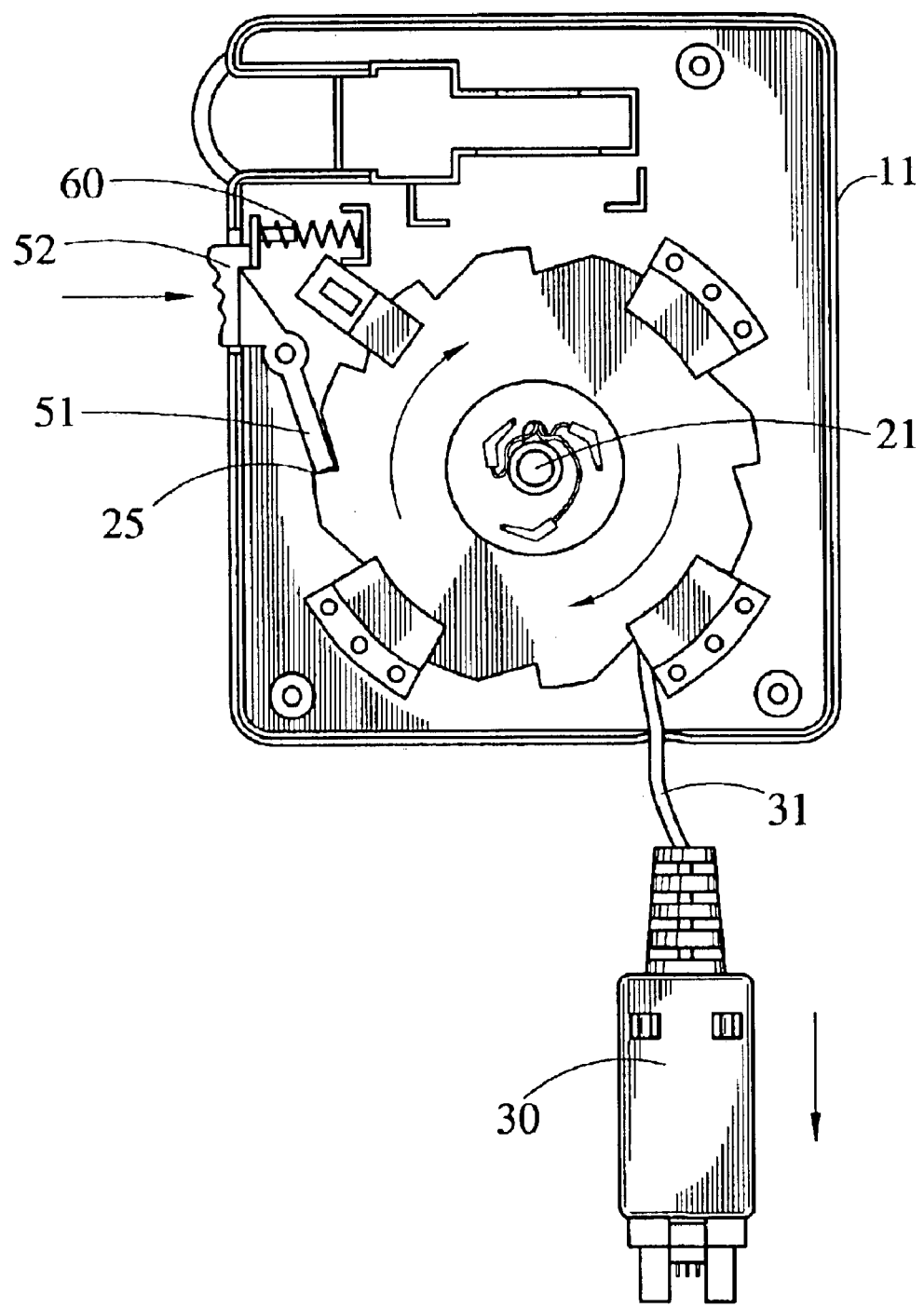
FIGS. 4,5 illustrate the functioning mechanism, on a plane setting, of the reel capstan in relation to the actuator assembly of the present invention.
Figure 5:
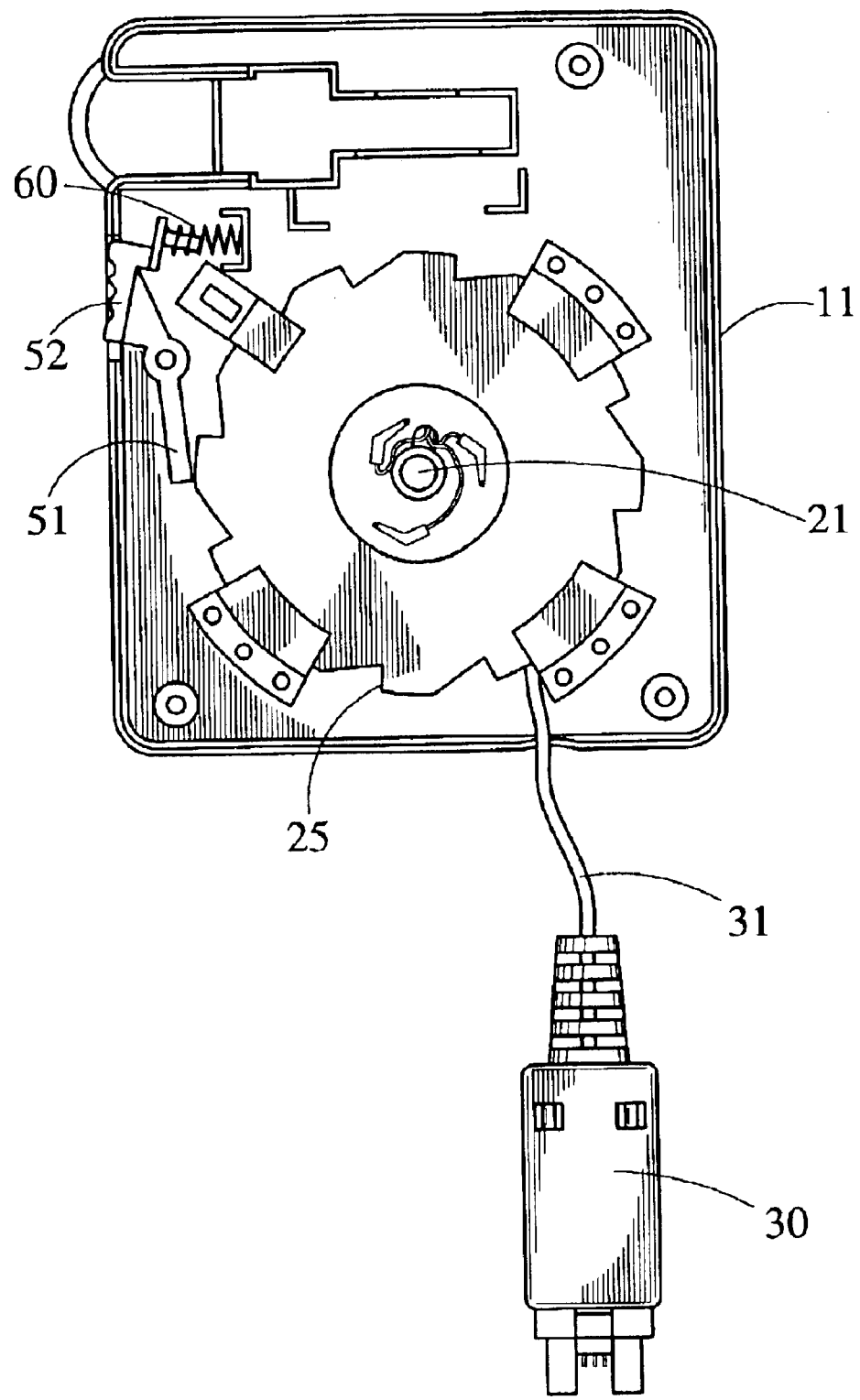

An actuator 50, provided hinged internally to the casing 10, and integral with a claw 51 and a stress receptacle 52 visible by way of an orifice 18 formed for the casing 10, duly acted upon by a resilient member 60 meant to exert resilient effects the actuator 50 will remain caught and rested in a stop position confined in the dents 25 that is engaged by the claw 51 in a usual, that is, normal states, such as is shown in FIG. 4, such that the reel capstan 20 is thereby immobilized from movement; still, where force is applied it is also possible for the actuator 50 to effect movement such that the claw 51 is cleared of a feed position confined in the dents 25, such as is shown in FIG. 5, so that leader 31 is eventually pulled away from the casing 10 or rolled up into the winding groove.

Characterized in that the receptacle plug 40 and the casing 10 are respectively furnished with conductive footing 41 and conductor 141, with the conductor 141 being a resilient conductive member sourced to the P.C. board 14, as shown in FIGS. 6, 7, conductive footing 41 and conductor 141 are made in contact if and only if the receptacle plug 40 sets in the power-in position, once the receptacle plug 40 switches to the stowage position, however, the conductive footing 41 will move accordingly till it becomes out of contact with the conductor 141.

In execution, there is a position sensor 19 to be incorporated to the casing 10, such a position sensor 19 is built with an engagement arm 191 meant to maintain contact relationship with the receptacle plug 40 which is furnished with a plurality of dents 42 to facilitate coupling with the engagement arm 191 when the receptacle plug 40 sets in the power-in position or in the stowage position, to thereby realize a sensed positioning effect.

Figure 8:
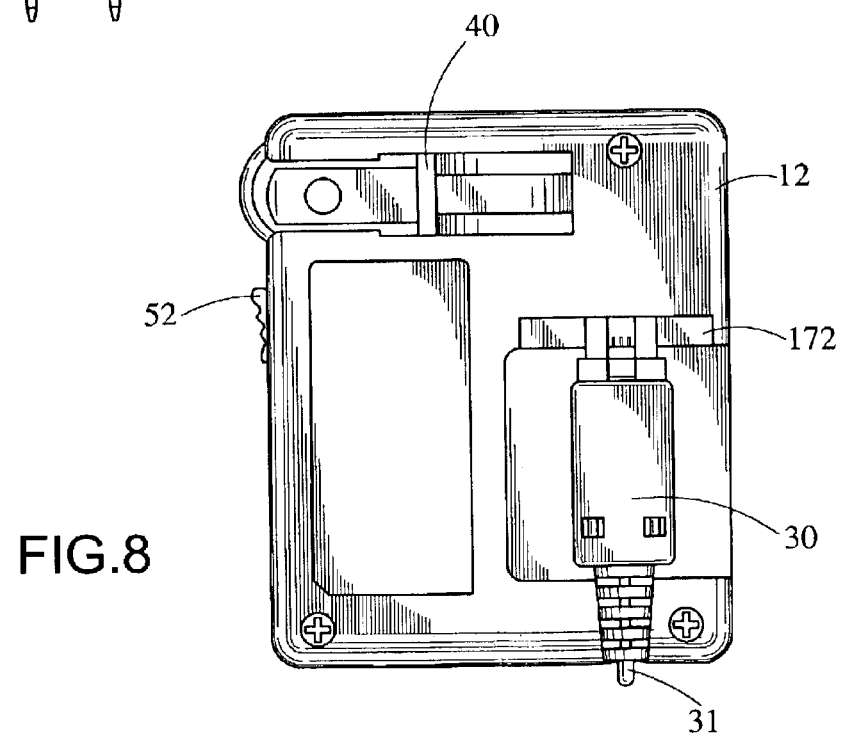
FIG. 8 is a rear view of the present invention.
Figure 9:
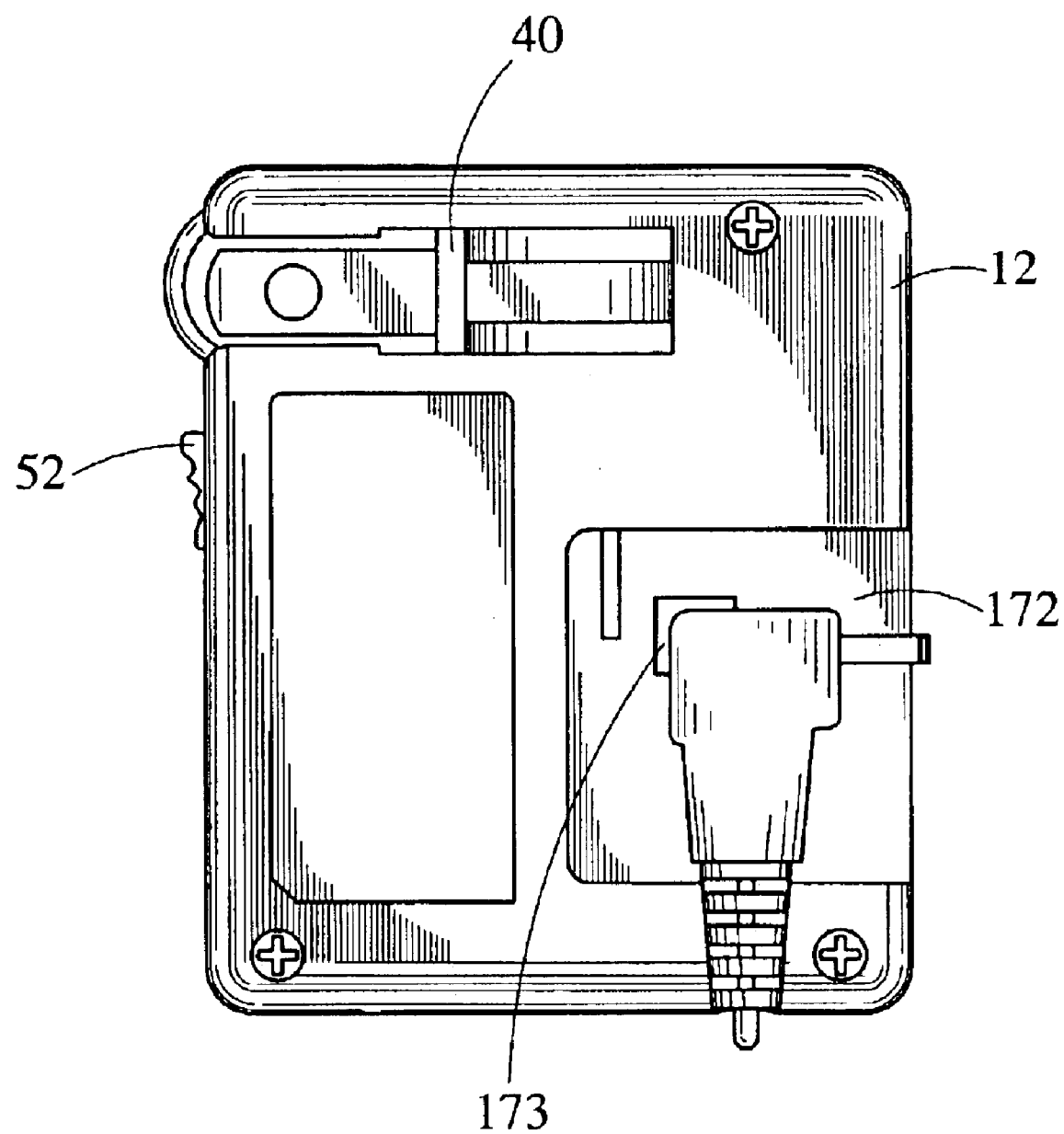
FIG. 9 illustrates a variant execution of the charging plug which forms part of the present invention.

Referring to FIG. 8, it will be appreciated that with the leader 31 rolled up in the winding groove, to keep the charging plug 30 from hanging about outside of the casing 10, the casing 10 is executed complete with a second dentate match groove 172 to facilitated coupling by the charging plug 30, and that eventually attached to the casing 10. The configuration of the second match groove 172 may be adjusted to accommodate the specific configuration of the charging plug 30, and where justified, a fixture shoe 173 may be incorporated in the second match groove 172 (see the illustration of FIG. 9).

It is to be understood that the above description and drawings are only used for illustrating one embodiment of the present invention, not intended to limit the scope thereof. Any variation and derivation from the above description and drawings should be included in the scope of the present invention.

What is claimed is:

1. A reel charging device comprising:

a casing;

a reel capstan mounted in said casing, configured with a winding groove and a plurality of match grooves about the outer rim of the totative perimeter;

a charging plug in conduction with leader that is rolled up in said winding groove;

a receptacle plug in electric communication with said charging plug;

an actuator, integral with a claw which is normally engaged in a stop position in said match grooves and is movable by application of a force to a feed position whereby the claw is disengaged from said match groove; and a resilient member acting on said actuator and biasing the actuator to the stop position, wherein said receptacle plug and said casing are respectively furnished with a conductive footing and a conduction member in contact only when the receptacle plug is in a power-in position.

2. The reel charging device as claimed in claim 1, wherein said reel capstan incorporates a dial exposed outside said casing, and on such a dial is formed a stress take-up groove.

3. The reel charging device as claimed in claim 1, wherein said receptacle plug is hinged to the casing and is displaceable relative to the casing, to a power-in position or a stowage position.

4. The reel charging device as claimed in claim 1, wherein said casing is furnished with a first match groove into which said receptacle plug may be laid for closure in a stowage position.

5. The reel charging device as claimed in claim 1, wherein said conduction member is made of resilient substances.

6. The reel charging device as claimed in claim 1, wherein said casing is furnished with a position sensor which incorporates in turn an engagement arm meant for maintaining in contact relationship with said receptacle plug which is furnished with a plurality of dentate cavities to facilitate coupling with the engagement arm once set to the power-in position or to the stowage position.

7. The reel charging device as claimed in claim 1, wherein said casing is configured with a first match groove and a second match groove to facilitate insertion of said charging plug and thence held in position onto the casing.

8. The reel charging device as claimed in claim 1, wherein said casing is furnished with an orifice leading to internal groove whereby the actuator may response to intentionally applied force coming from a point outside the casing.

* * * * *